Feb. 7, 1967     N. F. FYLER     3,303,374
CATHODE RAY TUBE INCLUDING FACE PLATE COMPRISING TAPERED
FIBER OPTICAL ELEMENTS MOUNTED IN AN OPAQUE MOSAIC
Original Filed Jan. 17, 1961     3 Sheets-Sheet 1
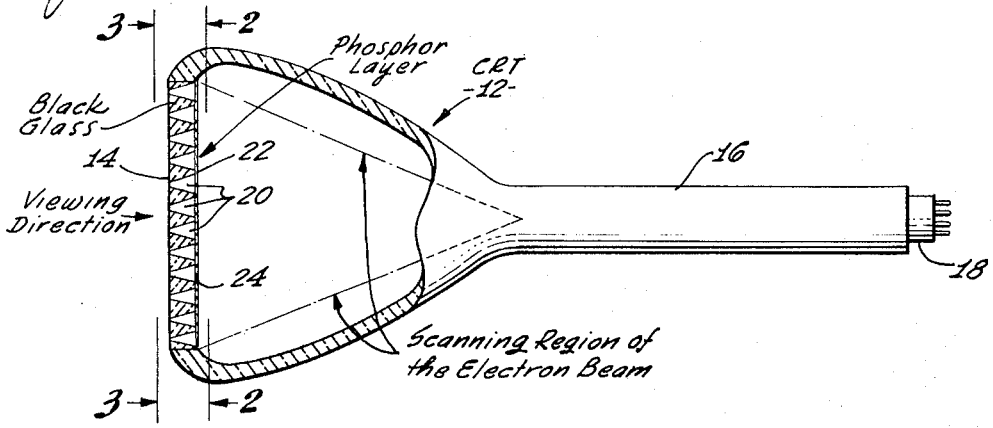
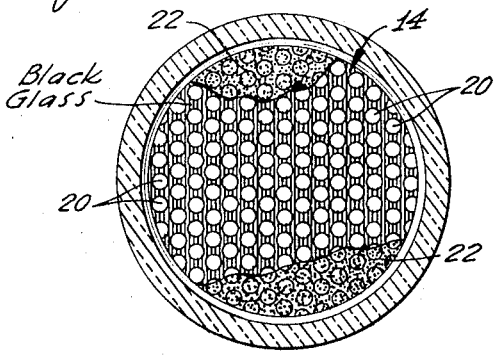 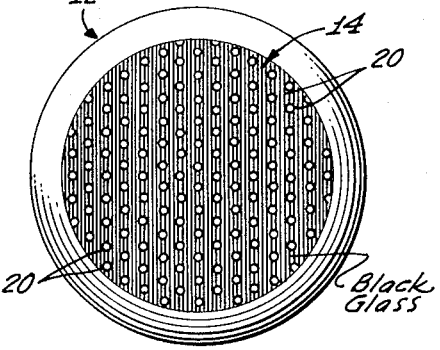
INVENTOR
Norman F. Fyler
By Alan C. Rose
Attorney

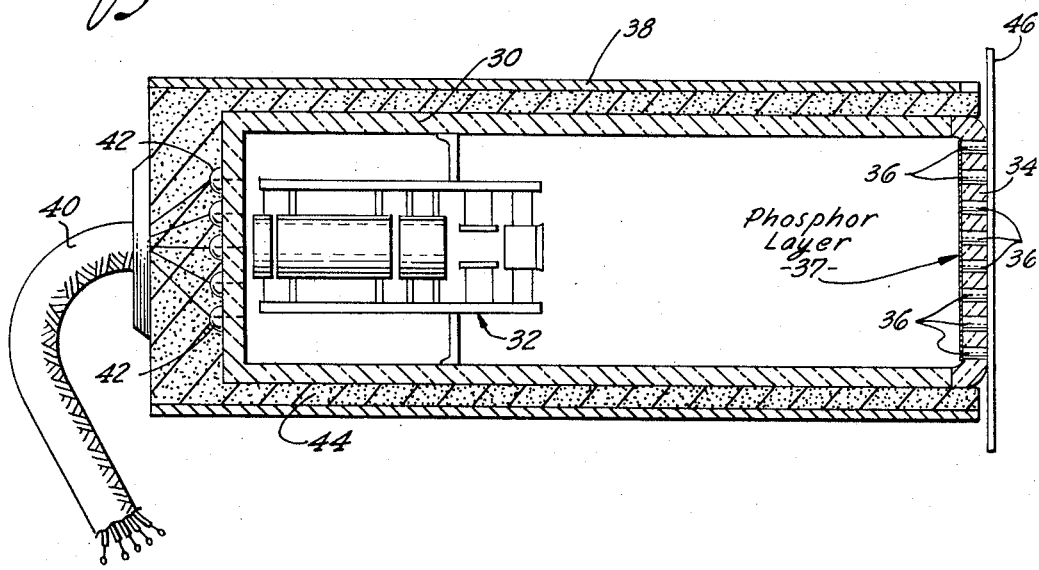
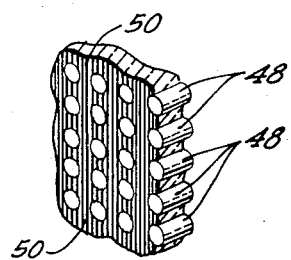
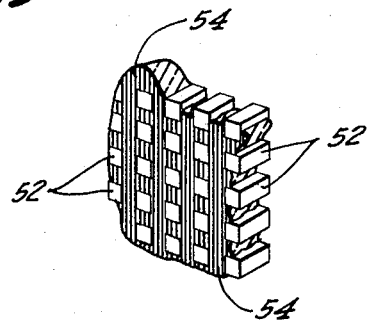

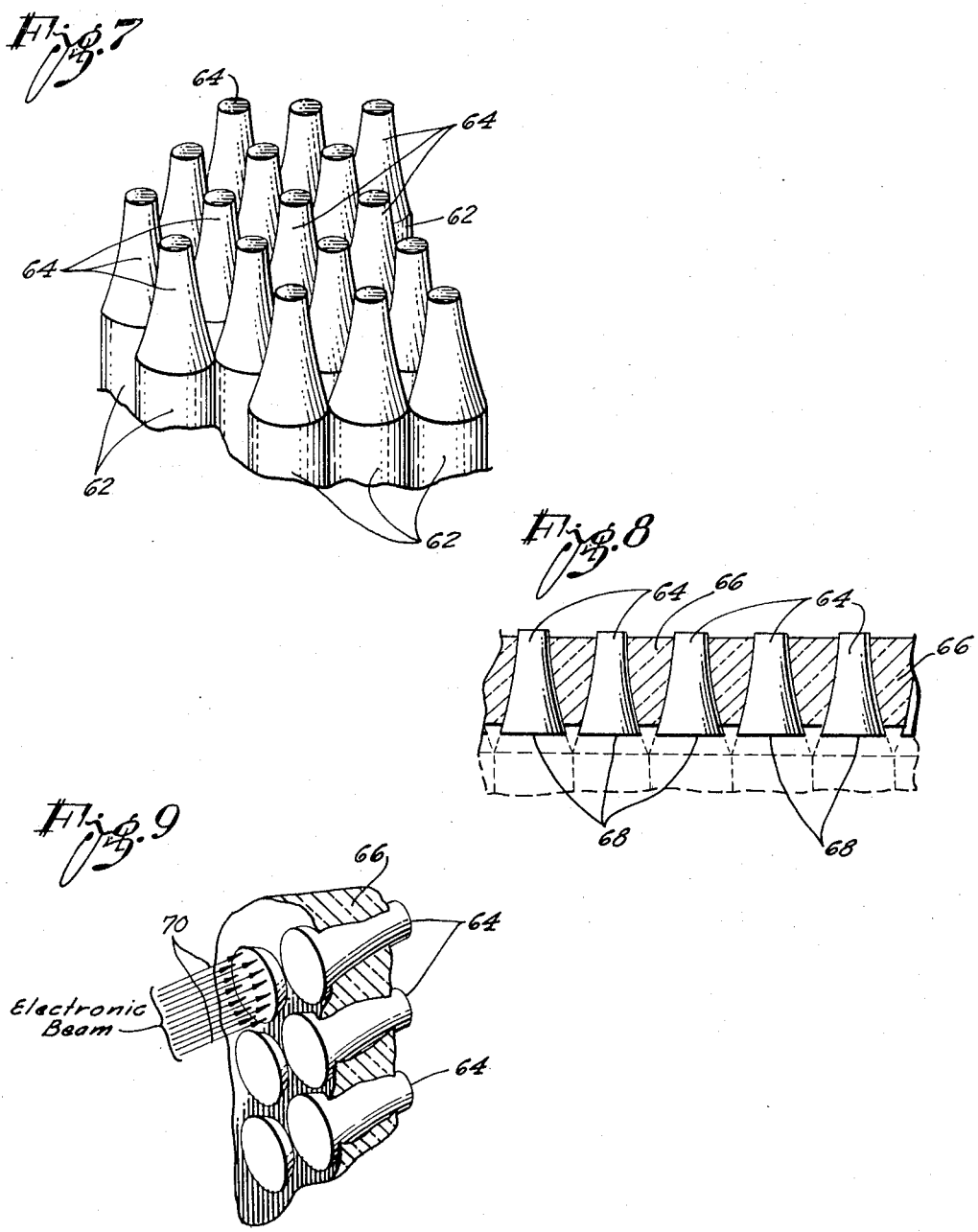

United States Patent Office 3,303,374
Patented Feb. 7, 1967

3,303,374
CATHODE RAY TUBE INCLUDING FACE PLATE COMPRISING TAPERED FIBER OPTICAL ELEMENTS MOUNTED IN AN OPAQUE MOSAIC
Norman Francis Fyler, Menlo Park, Calif., assignor to Litton Precision Products, Inc., San Carlos, Calif., a corporation of Delaware
Original application Jan. 17, 1961, Ser. No. 83,330. Divided and this application Mar. 15, 1965, Ser. No. 444,902
4 Claims. (Cl. 313—92)

This is a division of my application Serial No. 83,330, filed January 17, 1961, now abandoned.

The present invention relates to cathode ray tubes which may, for example, be viewed in a relatively high light environment such as bright daylight. The present invention is also suitable for use in cathode ray tubes wherein the cathode ray image is photographically reproduced.

It has previously been proposed to provide high contrast cathode ray tubes by employing a mixture of black and white phosphor particles. However, it is exceedingly difficult to make a phosphor which is black; generally, the resulting phosphor is gray. In view of the fact that a gray phosphor does not provide sufficient contrast when viewed at high light levels, this technique of combining phosphors has not solved the problem. It has also been proposed to place a black mesh screen or a black honeycomb-like mesh in front of the light emitting screen of a conventional cathode ray tube. This technique has proven inadequate because the light from the illuminated screen in restricted to a collinated region aligned with the axis of the tube so that the screen may not be viewed except from directly in front of the viewing screen.

A principal object of the present invention is to improve the contrast level of cathode ray tubes, without introducing the disadvantages noted above.

This object is achieved through the use of a cathode ray tube having a faceplate which includes an opaque matrix through which an array of fiber optic elements extend. With prosphor material located in the vicinity of the inner ends of the fiber optic elements, a high contrast image is presented at the viewing surface of the faceplate.

In a preferred embodiment of the invention, the fiber optic elements may be truncated cone-like elements disposed in an array in the faceplate, with their broader end surfaces adjacent the phosphor material. The smaller ends of the fiber optic elements extend through the opaque body of the faceplate to present a visible image on the viewing surface. The opaque background absorbs light incident on the viewing screen from the outside. Thus, viewing is possible even under daylight or sunlight conditions. Furthermore, the broad inner area of the fiber optic elements produces high intensity light points at the small area ends of the fiber optic elements on the viewing side of the faceplate. With this arrangement, most of the light developed at the large areas of phosphor material adjacent the inner ends of the fiber optic elements is transmitted to the viewing surface, thereby maintaining a high level of illumination and efficiency. A transparent conductive film may also be provided between the fiber optic elements and the phosphor coating. This serves to stabilize the "landing potential" of the electron beam and avoid distortion or diffusion of the beam.

Advantages of the present invention include the high efficiency produced by the increase in light intensity resulting from the cone-like shape of the fiber optic elements, and the improved contrast resulting from the light absorption characteristics of the opaque faceplate and the increased brightness of the point source of light.

The novel features which are believed to be characteristic of the invention both as to its organization and method of construction and operation, together with further objects and advantages thereof, will be better understood from the following description considered in connection with the accompanying drawing in which illustrative embodiments of the invention are disclosed, by way of example. It is to be expressly understood, however, that the drawing is for the purpose of illustration and description only and not as a limitation of the invention.

In the drawing:

FIG. 1 shows an improved cathode ray tube in accordance with the present invention;

FIG. 2 is a view of the faceplate of the device of FIG. 1 from the vacuum side with the phosphor layer partly removed;

FIG. 3 represents the viewing side of the faceplate;

FIG. 4 is a cross-section view of another embodiment of the invention;

FIGS. 5 and 6 are detailed views indicating various configurations of the faceplate and fiber optic elements which may be employed in the practice of the invention;

FIG. 7 shows an array of tapered or spired rods which may be employed in the fabrication of the faceplate of the cathode ray tube of FIG. 1;

FIG. 8 is a diagram showing another step in the formation of the faceplate; and

FIG. 9 indicates, diagrammatically, the mode of operation of the faceplate.

With reference to the drawing, FIG. 1 shows a cathode ray tube 12 having a faceplate 14 of high contrast construction, as discussed below. The cathode ray tube includes a conventional electron gun and beam deflection structure in the neck portion 16 of the tube. Suitable connections to the gun electrodes and to the deflection structure are accomplished through the pin connector assembly 18. External magnetic deflection coils may, of course, be employed.

The faceplate 14 is made of black glass or a similar opaque substance, and a large number of fiber optic elements 20 extend through the opaque material. A layer of phosphor material 22 is coated in the inner or vacuum side of the faceplate 14. Between the faceplate and the phosphor layer, a thin layer of transparent conductive material 24 may be provided. This layer may, for example, be of tin oxide or of another known transparent conductive material. Particularly for relatively low voltage cathode ray tubes, the conductive coating serves to stabilize the electron beam landing potential and avoid diffusion of the beam at the phosphor which might otherwise result from repulsion effects upon the accumulation of high charge densities at particular points on the surface of the phosphor.

As mentioned above, the present cathode ray tube may be viewed even under high intensity light conditions. This problem is obvious to all persons who have tried to watch television with strong outdoor or artificial light incident directly on the viewing surface of the television screen. In accordance with the present invention, this problem has been solved by the combination of an opaque screen for absorbing the major portion of the incident light and fiber optic elements for producing high intensity light patterns at spaced points on the otherwise opaque faceplate.

The individual fiber optic elements 20 as shown in FIG. 1 may be conical in shape. The pointed ends of the cones are cut off to provide discreet viewing points on the outer surface of the faceplate. In order to confine the light within the fiber optic elements, the side-walls of the elements are normally of a glass having lower index of refraction than the central portion of each element 20. This confines the light from the phosphor to the fiber optic element and increases the light intensity as the cross-section of the fiber optic element decreases.

FIGS. 2 and 3 are detailed showings of the configurations of the faceplate 14 from the vacuum side and the viewing side, respectively, of the faceplate. In FIG. 2 the phosphor coating 22 is shown broken away so that the larger inner ends of the fiber optic elements 20 are visible. In FIG. 3 the relatively small outer ends of the fiber optic elements 20 are shown extending through the opaque matrix which forms the body of the faceplate 14.

FIG. 4 shows an embodiment of the invention which is designed for use in a photographic exposure apparatus. The tube of FIG. 4 includes a glass envelope 30, an electron gun 32, and the fiber optic faceplate 34. An array of fiber optic elements 36 extend through the faceplate 34, and the inner surface of the faceplate is covered with a layer of phosphor material 37.

The cathode ray tube is enclosed in a magnetic shield 38 to prevent distortion of the electron beam by stray magnetic fields. Connections to the tube elements are made by a cable 40, connected to pins 42 which extend through the glass wall 30 of the vacuum tube. Insulating potting compound 44 extends between the glass 30 and the magnetic shield 38. It also serves to protect the connections 42 to the cable 40.

In the case of the fiber optic elements 36 of the embodiment of the invention shown in FIG. 4 they are of uniform cross-section in contrast to the tapered cross-section employed in the high contrast arrangement of FIG. 1. The matrix of faceplate 34 is preferably of opaque material as in the tube of FIG. 1 to avoid undesired light transmission between the fiber optic elements, or from the phosphor layer transversely through the thick faceplate.

In the operation of the tube of FIG. 4 a photo sensitive sheet is placed in contact with the outer surface of the faceplate 34 and suitable signals are supplied to the gun structure 32 so that a desired pattern is impressed on the array of fiber optic elements 36. As the electron beam energizes phosphor areas adjacent the inner ends of selected optic elements, light is generated by the phosphor and is transmitted through the fiber optic elements to the photographic sheet. The photo sensitive sheet 46 may be part of an extended roll of photo sensitive paper or may be in the form of a photographic plate. Suitable levels of light intensity may be provided to conform with the sensitivity of the sheet 46.

FIG. 5 is a detail of one form of faceplate. In the arrangement of FIG. 5, the fiber optic elements 48 are circular in form and extend completely through the opaque body 50 of the faceplate.

FIG. 6 shows an alternative arrangement in which the fiber optic elements 52 are of square cross-section. Other suitable forms in which the fiber optic elements are hexagonal or of other known shape may be employed. Similarly, the faceplate 54 may be of translucent and opaque layers, as long as light is not transmitted to the viewing surface except directly through the fiber optic elements.

The faceplate of the cathode ray tube of FIG. 1 may be made as indicated in FIGS. 7, 8 and 9. In FIG. 7 an array of rods 62 are provided with tapered or "spired" ends 64. The rods or wires 62 are packed tightly together by means of a frame or other mechanical arrangements. The ends of 64 may be tapered either before or after the bundling of the wires into an array. The tapered elements, in accordance with the present method, may be either the glass elements required for the embodiment of FIG. 1 of the present invention or they may be of metal for use in a direct writing, cathode ray tube, as shown in my co-pending patent application 16,734, filed March 22, 1960, now U.S. Patent 3,193,907.

In the case of fiber optic elements, the individual glass rods having the outer surface of a lower index of refraction are heated and elongated and then cut off by a suitable grinding operation prior to assembling into an array as shown in FIG. 7. In the case of metal elements for a direct writing tube, the wires may be of a tungsten material. In the case of these tungsten wires, they may be formed into a bundle or array and then the ends of the bundle may be immersed in a suitable acid solution.

Following the pointing and bundling steps, the tapered elements are secured into a faceplate as indicated in FIG. 8. In FIG. 8 the tapered ends 64 are shown imbedded in a matrix 66 of glass. This may be accomplished by engulfing the tapered elements in a media of glass, preferably in the form of finely divided glass powder. The glass powder which will form the sheet 66 in FIG. 8 has a lower melting point than the tapered glass or metal elements 64. The assembly is then heated to a temperature at which the glass 66 becomes molten, and thereby forms a sheet through which the tapered elements 64 are sealed. In the case of tungsten metal elements, Pyrex glass may be employed. For the faceplate of FIG. 1, black glass may be employed. More generally, the glass 66 should have a thermal coefficient of expansion which is compatible with that of the tapered elements 64. This requirement and that of a lower melting point for the glass 66 than for the tapered elements 64 may be satisfied by many known glasses and metals. Following hardening of the glass plate 66, the body of the rods or wires 62 are removed as indicated at 68 in FIG. 8. This may be accomplished by a suitable grinding or other machine operation. These exposed ends 68 form the target for the electron beam.

FIG. 9 shows the faceplate including the tapered elements 64, in operation. Following assemblage of the faceplate into a cathode ray tube, an electron beam as indicated at 70 in FIG. 9 is selectively focused on one of the tapered elements 64. In the case of the fiber optic elements, the broader ends of the elements 64 are coated phosphor material and the light which is produced as the electron beam strikes the phosphor, produces an image on the outer viewing surface of the faceplate. In the case of tapered metallic elements, the electron beam signal produces a visible image on a record member in contact with the outer surface of the faceplate. This method of operation is more fully explained in my U.S. Patent 3,193,907 noted above.

It is to be understood that the above-described arrangements are illustrative of the application of the principles of the invention. Numerous other arrangements may be devised by those skilled in the art without departing from the spirit and scope of the invention. Thus, by way of example, and not of limitation, the fiber optic elements in the device of FIG. 4, may be of a shape similar to those employed in FIG. 1. Similarly, the techniques employed, either in the arrangement of FIG. 1 or FIG. 4, may be applicable to the other device. It may also be noted that the opaque faceplate with associated cone-like optic elements of FIG. 1 may be employed as an adjunct in combination with currently available television or other cathode ray tubes to improve picture quality under adverse lighting conditions. Accordingly, it is to be understood that the present invention is only to be limited by the spirit and scope of the appended claims.

What is claimed is:

1. In combination, a vacuum tube of the cathode ray type comprising an extended faceplate, an array of truncated cone-like translucent elements extending through said faceplate with the broader area of said cone-like elements facing the inside of said tube, said faceplate being otherwise opaque, phosphor material mounted on the inner ends of said elements, and means for selectively directing an electron beam onto said phosphor material.

2. A cathode ray tube comprising a plurality of tapered, fiber optic elements, means including plate-like matrix of opaque material for supporting said fiber optic elements in a closely spaced array with the ends of said fiber optic elements exposed on either side of said plate-like supporting means, phosphor material mounted on the broader ends of said tapered fiber optic elements, and means for selectively directing an electron beam onto said phosphor material.

3. A high contrast cathode ray tube comprising a faceplate including an opaque layer, a plurality of tapered translucent fiber optic elements extending through the opaque layer with their thinner ends pointing outwardly, a layer of translucent conductive material on the inner surface of said faceplate, phosphor material located adjacent and in line with one end of said fiber optic elements, and means for selectively directing an electron beam onto said phosphor material.

4. A high contrast cathode ray tube comprising a black opaque faceplate, a set of tapered translucent elements extending through said faceplate with the larger diameter ends facing the vacuum side of the tube, phosphor material mounted on the larger ends of the tapered elements, and means for directing an electron beam against the phosphor material.

References Cited by the Examiner

UNITED STATES PATENTS

| | | | |
|---|---|---|---|
| 2,825,260 | 3/1958 | O'Brien | 88—1 |
| 2,979,632 | 4/1961 | MacNeille | 313—89 |
| 3,019,344 | 1/1962 | Seidman et al. | 250—208 |
| 3,141,105 | 7/1964 | Courtney-Pratt | 313—68 |
| 3,237,039 | 2/1966 | Fyler | 313—92 |

JAMES W. LAWRENCE, *Primary Examiner.*

V. LAFRANCHI, *Assistant Examiner.*